(12) United States Patent  
Helbers

(10) Patent No.: US 9,577,349 B2  
(45) Date of Patent: Feb. 21, 2017

(54) NEAR-FIELD MAGNETIC COMMUNICATION ANTENNA

(71) Applicant: NEAR FIELD MAGNETICS, INC., Milford, NH (US)

(72) Inventor: Jan H. Helbers, Marlborough, MA (US)

(73) Assignee: Near Field Magnetics, Inc., Milford, NH (US)

( * ) Notice: Subject to any disclaimer, the term of this patent is extended or adjusted under 35 U.S.C. 154(b) by 73 days.

(21) Appl. No.: 14/754,031

(22) Filed: Jun. 29, 2015

(65) Prior Publication Data

US 2016/0380365 A1 Dec. 29, 2016

(51) Int. Cl.

| | |
|---|---|
| *H04B 1/06* | (2006.01) |
| *H04B 7/00* | (2006.01) |
| *H01Q 21/28* | (2006.01) |
| *H01Q 7/00* | (2006.01) |
| *H04B 1/40* | (2015.01) |
| *H04B 5/02* | (2006.01) |
| *H04B 1/18* | (2006.01) |
| *H04B 1/10* | (2006.01) |

(52) U.S. Cl.  
CPC .............. *H01Q 21/28* (2013.01); *H01Q 7/00* (2013.01); *H04B 1/40* (2013.01); *H04B 5/02* (2013.01)

(58) Field of Classification Search  
CPC ............ H01Q 21/28; H01Q 7/00; H04B 5/02; H04B 5/0081; H04B 5/0087; H01J 37/3211; G06K 19/07779; G06K 19/07784

USPC .................................................. 455/274, 286  
See application file for complete search history.

(56) References Cited

U.S. PATENT DOCUMENTS

| | | |
|---|---|---|
| 3,938,044 A | 2/1976 | Lichtblau |
| 4,251,808 A | 2/1981 | Lichtblau |
| 5,602,556 A | 2/1997 | Bowers |
| 5,877,728 A | 3/1999 | Wu et al. |
| 5,914,692 A | 6/1999 | Bowers et al. |
| 6,164,241 A * | 12/2000 | Chen .............. H01J 37/321 118/723 I |
| 6,836,216 B2 | 12/2004 | Manov et al. |
| 8,854,188 B2 | 10/2014 | Stewart |
| 2009/0160725 A1 | 6/2009 | Rhodes et al. |

FOREIGN PATENT DOCUMENTS

GB 2475842 A 6/2011

* cited by examiner

*Primary Examiner* — Eugene Yun  
(74) *Attorney, Agent, or Firm* — Mesmer & Deleault PLLC; Ross K. Krutsinger

(57) ABSTRACT

A transceiver antenna has a transmit antenna coil defining a substantially closed transmit coil geometry circumscribing a transmit coil inner area. The transmit antenna coil is configured to conduct a current to generate a magnetic field. One or more receive antenna coils each define a closed receive coil geometry with a number of coil turns. The receive antenna coils are positioned to define one or more inner areas located within the transmit antenna coil inner area and one or more outer areas located outside of the transmit antenna coil. The inner areas and the outer areas of the receive antenna coil(s) are configured so that a first voltage induced by the transmit magnetic field into the outer areas of the receive antenna coils is attenuated by a second voltage induced by the transmit magnetic field into the inner areas of the receive antenna due to phase cancellation.

19 Claims, 7 Drawing Sheets

NEAR-FIELD MAGNETIC COMMUNICATION ANTENNA

BACKGROUND OF THE INVENTION

1. Field of the Invention

The invention relates generally to antennas for communication and more specifically to a near-field magnetic communication antenna.

2. Description of the Prior Art

Magnetic near-field communication provides secure communications with uses that include but are not limited to access control, financial transactions, and security systems. Some systems for near-field communication use a transmit antenna and a separate receive antenna. Coupling of the transmit magnetic field to the receive antenna plagues these types of systems because the transmit signal voltage is orders of magnitude greater than the desired receive signal voltage. For example, in some systems, the transmit signal voltage is about 400 volts and the desired receive signal voltage is about one volt or less. Therefore, to avoid overloading the receiver circuitry, transmit/receive switches are currently used to isolate the receiver from the transmitter when the transmitter is transmitting. These switches add significant cost and complexity to near-field communication systems due to the cost of the switch itself and also due to the need to control the transmit/receive switch to ensure the receiver is protected. The use of a transmit/receive switch, however, does not allow simultaneous transmitting and receiving of signals. Therefore, such a system is restricted to half-duplex communication only.

FIG. 1 shows a block diagram of typical transceiver 4 of the prior art. The transceiver 4 includes a transmitter 1, a receiver 2, and a transmit/receive switch 3. The transmitter 1 is connected to a transmit coil 5 and the receiver 2 is connected to a receive coil 6 via the transmit/receive switch 3. When the transmitter 1 is transmitting, the transmit/receive switch 3, is switched to ground 7 so that no current or voltage from the transmitted signal is coupled into the receiver 2. As a result, the receiver 2 is protected from the high-power transmit signal. When the transceiver 4 is in receive mode, the transmit/receive switch 3 connects the receiver 2 to the receive coil 6, thereby allowing the receiver 2 to receive the desired signal. When the transceiver 4 is receiving, the transmitter 2 is turned off.

In some embodiments of the prior art, the transmit coil and the receive coil are the same coil. In such a system with only one coil, the transmit/receive switch 3 switches between the transmitter 1 and the receiver 2 depending on the state of the transceiver 4. Therefore, simultaneous transmitting and receiving is not possible.

Much work has been done to optimize loop antennas for electronic article surveillance systems. The prior art includes antennas disclosed by Lichtblau (U.S. Pat. Nos. 3,938,044 and 4,251,808), Bowers et al. (U.S. Pat. Nos. 5,602,556 and 5,914,692), Stewart (U.S. Pat. No. 8,854,188), Rhodes et al. (GB 2,475,842A and US 20090160725A1), and Manov et al. (U.S. Pat. No. 6,836,216). All of these patent references disclose antenna designs that use a single function transmit antenna and a single function receive antenna that are separated by a small distance. These systems detect signals within a range of a few meters and are not used for communication.

Rhodes et al. disclose a transmit-receive antenna that has a transmit loop antenna and a receiver solenoid antenna positioned with its axis in the plane of the transmit loop antenna. The collocated transmit and receive antennas reduce the signal generated in the solenoid receiver antenna during transmit because the receive coils are aligned orthogonally to the magnetic field generated by the transmit coil.

Manov et al. disclose an electronic article surveillance system that has two antenna arrays placed in a spaced-apart parallel relationship, where each antenna consists of two coil assemblies. Each coil assembly has a transmitting coil, a receiving coil, and a compensating coil, where windings of the receiving coil are farther from the windings of the transmitting coil than those of the compensating coil. Antennas are powered in different phases to generate a magnetic field of different orientations within an interrogation zone between the arrays. When a marker is placed near the antenna assembly, the field disturbances produced by its re-magnetization induce voltages in both the receiving coil and in the compensating coils. When used in a theft-prevention system, for example, a person passing through the gap (i.e., the interrogation zone) between the transmit and receive antennas while carrying an article containing a surveillance marker would be detected based on disturbances in the magnetic field. To prevent false alarms due to a shopper merely passing near the system with a surveillance marker, these systems use signal phasing in multiple loops to reduce the range of the signal.

Stewart discloses a radio frequency identification (RFID) system that includes multi-loop signal-cancelling antennas and RFID transponders. The system reduces interference from nearby metal structures in animal and livestock applications. The signal-cancelling antennas limit the spatial penetration of the antenna's magnetic field beyond the vicinity occupied by the RFID transponder. In Stewart's system, a single multi-loop antenna is used for transmit and receive functions. The loops of the signal-cancelling antenna are connected in series, all loops of the antenna have the same number of windings, and loops carry the same electrical current when driven by the signal.

In contrast to systems used for theft prevention and livestock inventory systems, some near-field magnetic communication systems use loop antennas to maximize the signal strength and distance rather than containing it to a small defined area. Additionally, some communications systems collocate the transmit and receive antennas in a closely spaced arrangement so that each communicating entity can both transmit and receive signals.

SUMMARY OF THE INVENTION

The prior art systems mentioned above fail to reduce coupling between collocated transmit and receive antennas while also maximizing signal range. Antennas of the present invention solve this problem by eliminating the coupling of the transmit signal into the receiver when the transmit coil and the receive coil are collocated on parallel planes or on a single plane. By placing one or more receive coils inside the closed geometry of the transmit coil, placing one or more receive coils outside of the transmit coil, and connecting all of the receive coils in series, the transmit signal is eliminated or sufficiently reduced from the receiver. Since the transmit signal voltages received by the inner and outer receive coils are 180 degrees out of phase, the sum of these signals in the inner and outer receive coils cancel each other. The sum of the areas enclosed by the turns of the inner receive coil (also known as the turns-area product) must equal the sum of the areas enclosed by the outer coils in order to achieve complete phase cancellation of transmit signals in the inner and outer receive coils. If these turns-area products are not equal, phase cancellation reduces, rather than fully eliminates, the local or collocated transmit signal to the receiver.

For the same reason, when an external signal impinges on the inner and outer receive coils, the signals of the inner and outer receive coils are in phase. As a result, the signals impinging on the inner and outer receive coils add, thereby increasing the receiver sensitivity of the system and allowing for an increased range of near-field magnetic communication. This antenna structure also obviates the need for a transmit/receive switch and all of its complexity. Additionally, one could transmit and receive continuously at the same time or using the same frequency or using different frequencies.

For the foregoing reasons, a need exists for a near-field magnetic antenna that allows for the transmission and receipt of near-field magnetic signals without the complexity associated with transmit/receive switch protocols currently in use. The present invention satisfies this and other objectives by providing a transmit/receive antenna where phase cancellation eliminates or sufficiently reduces the transmit signal coupled to the receive circuitry.

The present invention provides antennas for use in near-field communication systems where range is important. Antennas of the present invention overcome the problem of magnetic field coupling into the very sensitive receiver circuitry from the collocated high-power transmitter. Embodiments of an antenna use collocated transmit and receive coils such that one or more receive coils are located inside of the transmit coil (inner receive coils) and one or more receive coils are located outside of the transmit coil (outer receive coils). The inner and outer receive coils, which will have induced voltages from the transmit coil that are 180 degrees out of phase, are sized and located in such a manner that the voltage induced in the receive coils by the transmit coil will cancel when the receive coils are connected in series. When an external signal impinges on the inner and outer receive coils, however, the induced voltage in the coils will be in phase and therefore increase the sensitivity of the receiver when connected in series. This antenna eliminates the need for transmit/receive switches and their associated complexity.

In one aspect of the present invention, a transceiver antenna includes a transmit antenna coil substantially defining a closed transmit geometry with an innermost transmit coil turn and an outermost transmit coil turn. One or more inner receive antenna coil(s) is disposed within the innermost transmit coil turn of the transmit antenna coil. Each inner receive antenna coil has a plurality of coil turns substantially defining a closed inner coil geometry with an effective inner coil area. At least one outer receive antenna coil is connected in series with the inner receive antenna coils and located outside of the outermost transmit coil turn of the transmit antenna coil. Each outer receive antenna coil has a plurality of outer receive coil turns that each substantially define a closed outer receive coil geometry with an effective outer receive coil area.

In one embodiment, the transceiver antenna is configured so that the sum of the enclosed inner receive coil area for the plurality of inner coil turns of the inner receive antenna coil(s) is substantially equal in magnitude to a sum of the outer receive coil areas of the plurality of outer coil turns of the outer receive antenna coils.

In another embodiment, conducting a current through the transmit antenna coil induces an inner receive coil voltage in the inner receive antenna coil(s) and induces an outer receive coil voltage in the outer receive antenna coil(s). The inner receive coil voltage and the outer receive coil voltage cancel each other completely or partially due to phase cancellation, where the amount of cancellation depends on the coil design and desired amount of cancellation. In some embodiments, the inner receive coil voltage and the outer receive coil voltage cancel each other by at least 99% due to phase cancellation. In another embodiment, the inner receive coil voltage and the outer receive coil voltage cancel each other by at least 99.6% due to phase cancellation. In yet another embodiment, the inner receive coil voltage and the outer receive coil voltage cancel each other 100%.

In another embodiment, the transmit antenna coil, the inner receive antenna coil, and the at least one outer receive antenna coil are co-planar.

Another aspect of the present invention is drawn to a transceiver for near-field communication. In one embodiment, the transceiver includes a substantially planar substrate having a first substrate surface and a second substrate surface opposite of and substantially parallel to the first substrate surface. A substrate axis extends perpendicular to the substantially planar substrate. A transmit antenna coil is disposed on the substrate and defines a substantially closed transmit coil geometry with a transmit coil inner area, where the transmit antenna coil is configured to generate a transmit magnetic field when a transmit antenna current is applied. At least one receive antenna coil is disposed on the substrate and electrically insulated from the transmit antenna coil, where each receive antenna coil defines a substantially closed receive coil geometry with a number of coil turns. The receive antenna coil(s) is (are) positioned relative to the transmit coil geometry (i.e., as viewed along the substrate axis) to define one or more inner areas located within the transmit antenna coil inner area and one or more outer areas located outside of the transmit antenna coil geometry. The inner areas and the outer areas are sized and configured so that a first voltage induced by the transmit magnetic field into the outer areas of the receive antenna is attenuated by a second voltage induced by the transmit magnetic field into the inner areas of the receive antenna due to phase cancellation between the first voltage and the second voltage.

In another embodiment, the one or more inner areas and the one or more outer areas of the receive antenna are sized and configured so that the first voltage induced by the transmit magnetic field into the one or more outer areas of the receive antenna is attenuated by the second voltage induced by the transmit magnetic field into the one or more inner areas of the receive antenna due to phase cancellation between the first voltage and the second voltage. Embodiments of the present invention allow reduction of the voltage induced in the receive coil by the collocated transmitter coil to levels comparable to or less than the desired signal received from a transmitter external to the collocated transmit and receive coils of the transceiver.

In another embodiment, the transmit antenna coil is disposed on the first substrate surface and the at least one receive antenna coil is disposed on the second substrate surface.

In another embodiment, the receiver antenna includes at least one inner receive coil disposed within the transmit coil inner area and defining the one or more areas located within the transmit antenna coil inner area. The receive antenna also includes at least one outer receive coil disposed outside the transmit antenna coil and defining the one or more outer areas located outside of the transmit antenna coil. The at least one inner receive coil is connected in series with the at least one outer receive coil.

In another embodiment, the transmit antenna coil, the at least one inner receive coil, and the at least one outer receive coil are coplanar.

In another embodiment, the at least one outer or inner receive coil includes a plurality of outer or inner receive coils connected in series.

In another embodiment, one or more of the transmit antenna coil(s) and the at least one receive antenna coil(s) are circular coils.

In another embodiment, the transceiver also includes a receiver connected in series with the at least one receive antenna and configured to receive a receive signal voltage. A transmitter is connected in series with the transmit antenna coil and configured to conduct a transmitter current into the transmit antenna coil that induces the first voltage and the second voltage. In one embodiment, the first voltage and the second voltage induced in the at least one receive antenna by the transmit antenna coil combine to result in a voltage about equal to or less than the receive signal voltage.

In another embodiment, the receive antenna comprises one or more receive coils positioned to overlap the transmit antenna coil, wherein the one or more receive coils are on a receive plane substantially parallel to a transmit plane of the transmit antenna coil.

Another aspect of the invention is directed to a variation on the transceiver antenna. In one embodiment, a conductive inner transmit coil is in a first plane and defines a substantially closed shape with a plurality of concentric inner transmit coil turns. A plurality of conductive receive coils are in a second plane parallel to the first plane. The plurality of conductive receive coils are connected in series and located outside of the conductive inner transmit coil, where each of the plurality of conductive receive coils substantially defines a closed receive coil shape with a plurality of concentric receive coil turns. A conductive outer transmit coil connected in series with the conductive inner transmit coil, and substantially defining a closed outer transmit coil shape with a plurality of concentric outer transmit coil turns each enclosing the plurality of conductive receive coils and the conductive inner transmit coil. Conducting a transmitter current through the conductive inner transmit coil and the conductive outer transmit coil generates an outer transmit coil magnetic field and an inner transmit coil magnetic field. The outer transmit coil magnetic field induces a first voltage and the inner transmit coil magnetic field induces a second voltage in the plurality of conductive receive coils. The combination of the first voltage and the second voltage results in a reduced receiver voltage compared to either of the first voltage or the second voltage due to phase cancellation between the first voltage and the second voltage.

In one embodiment, the phase cancellation between the first voltage and the second voltage is at least 99%.

In another embodiment, the first plane is the same as the second plane.

In another embodiment, the first plane is parallel to the second plane.

In another embodiment, the transceiver has a receiver connected in series with the at least one receive antenna and configured to receive a receive signal voltage. A transmitter is connected in series with the transmit antenna and configured to conduct a transmitter current into the transmit antenna inner and outer coils that produces the outer transmit coil magnetic field and the inner transmit coil magnetic field. The first voltage and the second voltage induced in the at least one receive antenna by the transmit antenna magnetic fields attenuate each other due to phase cancellation.

In another embodiment, the first plane is a first substrate surface of a planar substrate and the second plane is a second substrate surface.

For embodiments of the present invention, the closed shape of the conductive transmit coils and receive coils may be a circle, a rectangle, a triangle, a hexagon, and an octagon, or any other arbitrary closed geometric shape.

DETAILED DESCRIPTION

Figure 1:
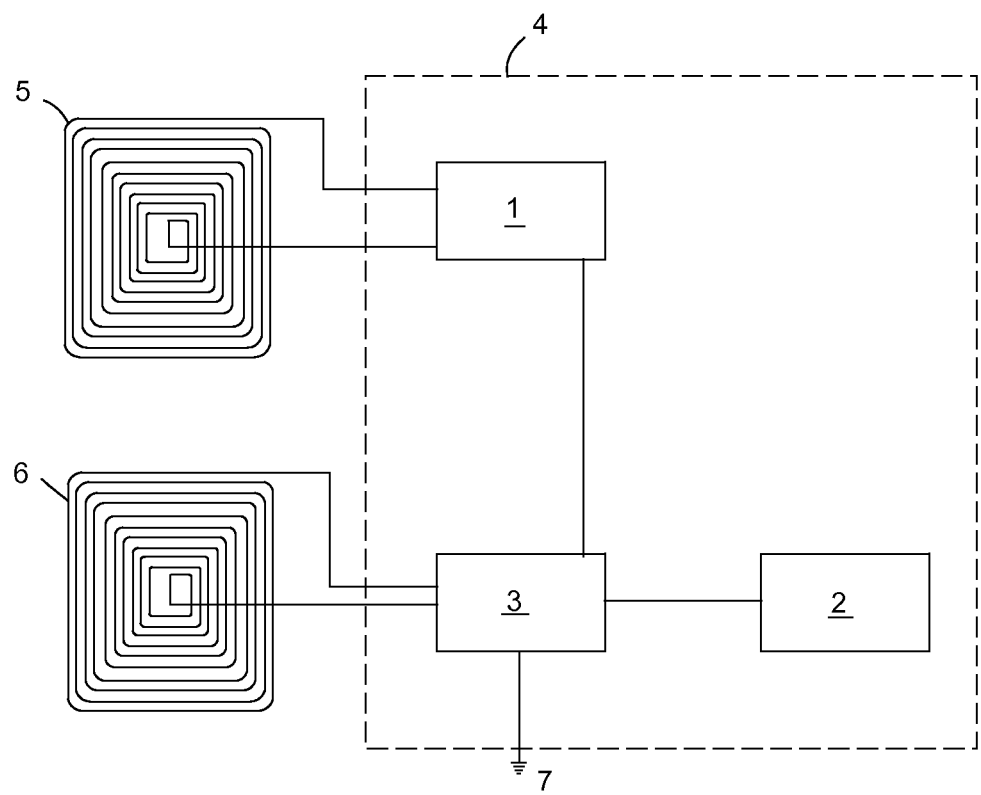
FIG. 1 is a block diagram of a transceiver of the prior art, showing a transmit/receive switch coupled to a transmitter coil and a receiver coil.
Figure 2:
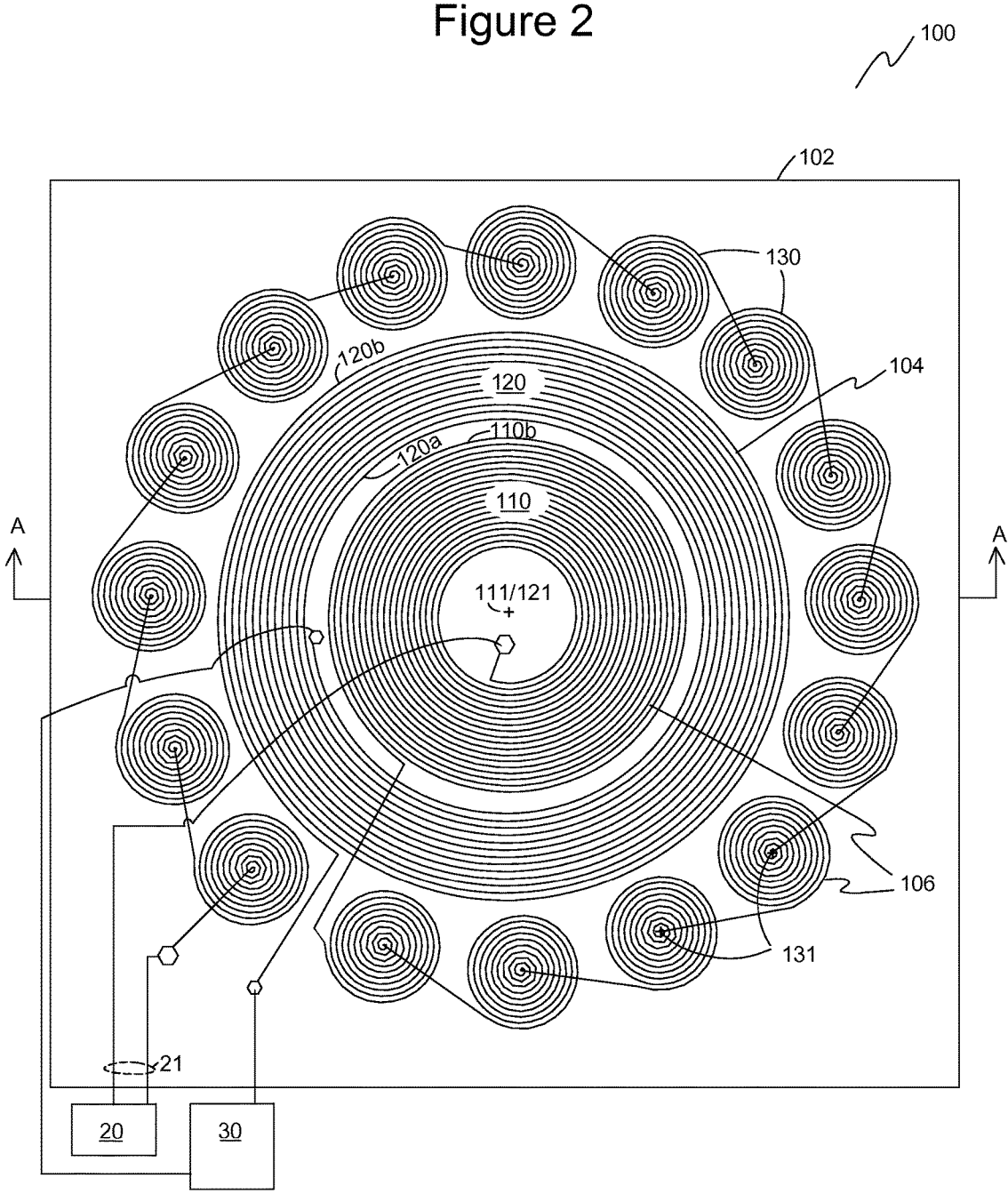
FIG. 2 is a plan view of one embodiment of a transceiver of the present invention showing a printed circuit board that includes an inner receive coil, a plurality of outer receive coils, and a transmit coil positioned radially between the inner receive coil and the outer receive coils.

Exemplary embodiments of the present invention are illustrated in FIGS. 2-8. FIG. 2 shows a plan view of one embodiment of a transceiver antenna 100 of the present invention. Transceiver antenna 100 includes a transmit antenna 104 and a receive antenna 106. In one embodiment, transceiver antenna 100 has a substrate 102 upon which transmit antenna 104 and receive antenna 106 are disposed. For example, substrate 102 is a circuit board with transmit antenna 104 and receive antenna 106 disposed as conductive traces. Receive antenna 106 includes one or more inner receive coil(s) 110 and one or more outer receive coil(s) 130. The inner receive coil 110 is connected in series with the outer receive coils 130, which themselves are connected in series. Thus, all of the receive coils 110, 130 are connected in series.

In one embodiment as shown, receive antenna 106 has one inner receive coil 110 and a plurality of outer receive coils 130. In the embodiment shown, there are sixteen outer receive coils 130. One or more inner receive coils 110 are positioned within a transmit coil inner area circumscribed by transmit antenna 104. Here, innermost turn 120a defines the transmit coil inner area. A plurality of outer receive coils 130 are positioned outside of transmit antenna 104. For example, transmit coil 120 is positioned outside of an outermost turn 110b (e.g., outer diameter) of inner receive coil 110, inner receive coil 110 is positioned inside of an innermost turn 120a (e.g., inner diameter) of transmit coil 120, and outer receive coils 130 are positioned outside of an outermost turn 120b (e.g., outer diameter) of transmit coil 120. Inner receive coil 110 may be one or more coils.

In one embodiment, each of coils 110, 120, 130 has a circular or spiral shape. Other shapes are acceptable and coils 110, 120, 130 do not have to have the same shape. For example, coils 110, 120, 130 may be triangular, rectangular, polygonal, or other regular or irregular shapes provided that the shape has a closed or substantially closed geometry.

In some embodiments, such as shown in FIG. 2, transmit antenna 104 and receive antenna 106 are coplanar or substantially coplanar as is the case when disposed on a single face of a planar substrate 102, such as a printed circuit board. In use, transmit antenna 104 is connected to a transmitter 30 and receive antenna 106 is connected to a receiver 20 configured for receive voltage 21. In other embodiments, transmit antenna 104 and receive antenna 106 are disposed in parallel planes, such as when transmit coil 120 and receive coils 110, 130 are disposed on opposite, parallel faces of substrate 102 or when disposed on other structures. For example, coils 110, 120, 130 are made of wire wound on cylindrical substrates 102 and positioned to achieve the same functionality as when substrate 102 is a printed circuit board.

Figure 3:
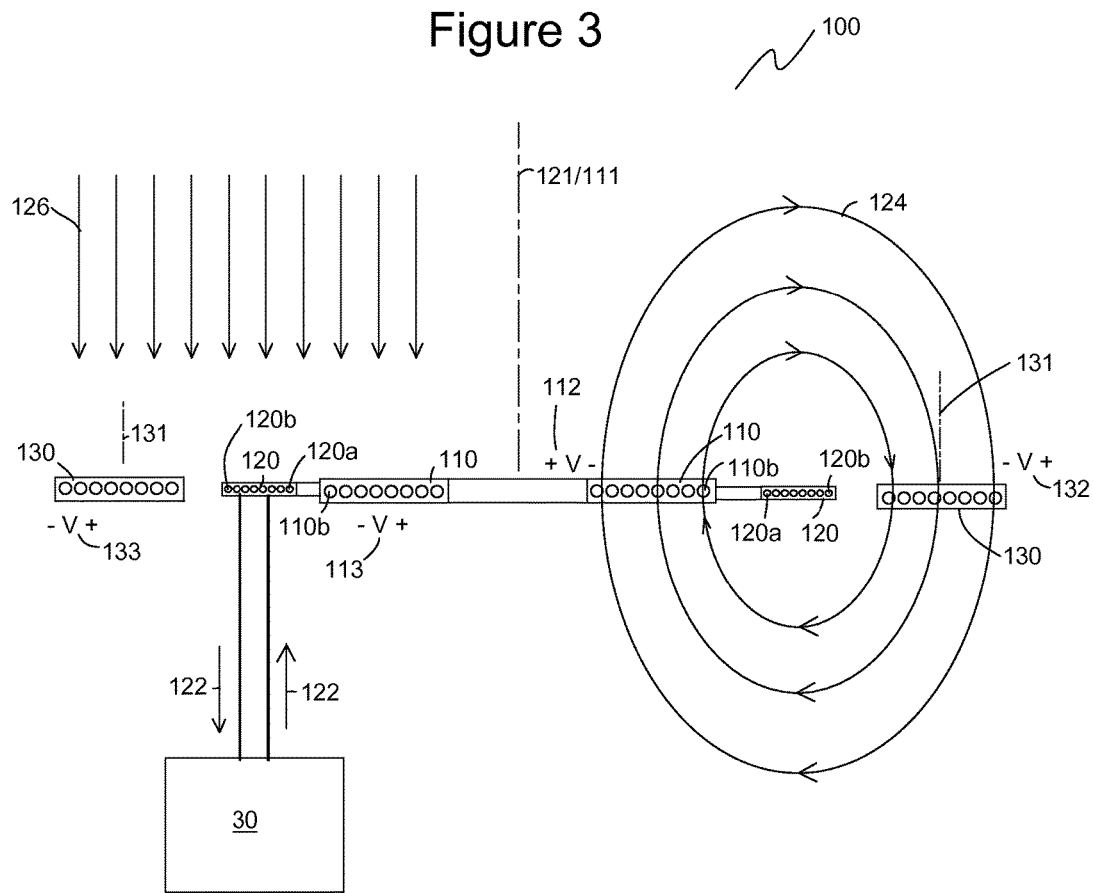
FIG. 3 is perspective diagram of the transceiver of FIG. 2 substantially taken along line A-A and illustrating the theory of operation of the transceiver.

Inner receive coil 110 has an inner receive coil axis 111, each outer receive coil 130 has an outer receive coil axis 131, and transmit coil 120 has a transmit coil axis 121, where axes 111, 121, 131 extend perpendicular to a plane of the respective coil (also shown in FIG. 3). In one embodiment, each inner receive coil axis 111, each outer receive coil axis 131, and transmit coil axis 121 are all parallel to one another. In some embodiments, inner receive coil axis 111 and transmit coil axis 121 are the same axis. As shown in FIG. 2, each outer receive coil axis 131 is distinct from inner receive coil axis 111 of inner receive coil(s) 110.

Receive coils 110, 130 and transmit coil 120 each have a closed or substantially closed shape, such as a circle, a rectangle, a triangle, or another shape. The term "substantially closed" acknowledges that for a coil with a plurality of concentric turns that spiral between a smaller innermost turn and a larger outermost turn, the adjacent turns do not overlap to close the shape. Thus, where one turn of the spiral shape passes the next turn, a substantially closed geometry is defined. Turns of coils 110, 120, 130 may be concentric (e.g., a planar coil), overlapping (e.g., wire wrapped in overlapping turns around a rod), or in a spiral configuration (e.g., wire wrapped in a spiral along a rod.)

FIG. 3 is a simplified sectional diagram illustrating the function of transceiver antenna 100 of FIG. 2 as viewed along line A-A. As noted above, an inner receive coil 110 is disposed inside the area circumscribed by innermost turn 120a of transmit coil 120 as viewed along transmit coil axis 121. Transmit coil axis 121 is the same as inner receive coil axis 111, but this does not have to be the case. A plurality of outer receive coils 130 are disposed outside of outermost turn 120b of transmit coil 120. When transmit coil 120 is active (i.e., powered by transmitter 30), a transmit loop current 122 conducted through transmit coil 120 generates a magnetic field 124 around transmit coil 120 according to Ampere's Law.

Illustrated on the right-side of FIG. 3, magnetic field 124 produced by the transmit coil 120 impinges on outer receive coil 130 in a downward direction to induce an outer receive coil voltage 132 in outer receive coil(s) 130. Magnetic field 124 impinges on inner receive coil 110 in an upward direction to induce an inner receive coil voltage 112 that is ~180° out of phase with outer receive coil voltage 132. It is understood that magnetic field 124 would be mirrored on the left side of FIG. 3 with similar effect, but is not shown in FIG. 3 for clarity. According to the right hand rule, transmitter magnetic field 124 will pass through the inner receive coil(s) 110 (upward) and the outer receive coil(s) 130 (downward) in substantially opposite directions relative to each other. Therefore, transmitter magnetic field 124 induces outer receive voltages 132 in outer receive coil(s) 130 and inner receive voltages 112 in inner receive coil(s) 110 that are out of phase with each other. By designing antenna 100 such that inner receive coil(s) 110 and outer receive coil(s) 130 are connected in series and produce the same magnitude of voltage (i.e., $\Sigma V_{112} = -\Sigma V_{132}$) when excited by the transmit coil 120, receiver 20 (shown in FIG. 2) will see no signal generated by transmit magnetic field 124 from receive antenna 106 (shown in FIG. 2) during transmission because inner receive voltages 112 from inner receive coil(s) 110 cancel outer receive voltages 132 from outer receive coil(s) 130 and vice versa. This phase cancellation results from inner receive coil(s) 110 being located within the area circumscribed by transmit coil 120 and outer receive coil(s) 130 being located outside of transmit coil 120.

To protect the circuitry of a receiver 20 (shown in FIG. 2), when transmit coil 120 generates a magnetic field, the sum of voltages induced in series-connected outer receive coils 130 substantially cancel the sum of voltages induced in inner receive coil(s) 110. In some embodiments, these voltages completely cancel each other or approximate zero when transmit coil 120 generates a magnetic field during transmission. Preferably, the phase cancellation results in attenuation by at least 99%. More preferably, phase cancellation results in attenuation of at least 99.4%. Phase cancellation of a smaller degree is also acceptable depending on the design of antenna 100 and the associated circuitry of transmitter 30 and receiver 20 (shown in FIG. 2).

For example, when the voltage induced in inner receive coil 110 is 100.0 v, the voltage induced in outer receive coils 130 is −99.4 v. Therefore, due to series connection of inner and outer receive coils 110, 130 and the opposite polarity or phase cancellation of the induced voltages, these voltages combine with 99.4% phase cancellation for a resulting receive signal 21 (shown in FIG. 2) of 0.6 v.

Figure 3B:
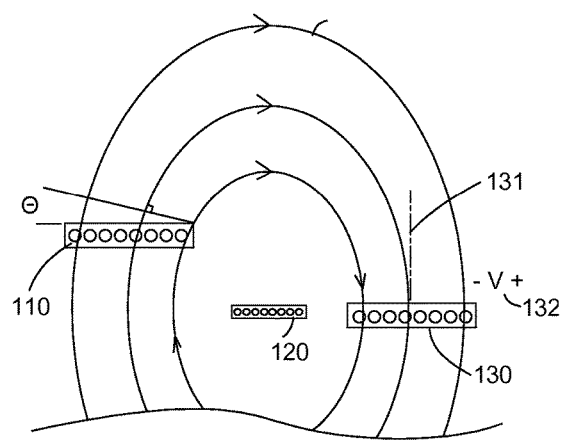
FIG. 3B is a sectional view of part of the transceiver of FIG. 2 showing an outer receive coil in a plane parallel to the transmit coil, where the effective area of the outer receive coil is reduced due to the angle of incidence of the magnetic field.
Figure 3A:
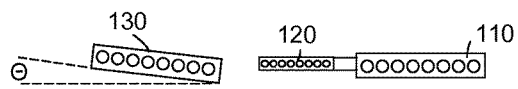
FIG. 3A is a sectional view of part of the transceiver of FIG. 2 showing an outer receive coil canted with respect to the transmit and inner receive coils.

To achieve this result with coplanar transmit and receive antennas 104, 106 (shown in FIG. 2), the sum of areas enclosed by turns of the inner receive coil(s) 110 is equal to or approximately equal to the sum of areas enclosed by turns of the outer receive coil(s) 130. If, however, the plane of inner receive coil 110 or outer receive coil(s) 130 are canted at an angle θ (shown in FIG. 3A) with respect to the plane of transmit coil 120 the effective area of the canted receive coils 110 and/or 130 is reduced by multiplying by the cosine of the cant angle θ. Similarly, as shown in FIG. 3B, when one or more of receive coils 110, 130 are on a plane parallel to, but axially spaced apart from a plane containing transmit coil 120, the actual area of receive coils 110, 130 is also reduced to the effective area by multiplying by the cosine of angle θ.

For the purpose of this application, the "effective area" of a canted coil with cant angle θ>0 means the area of a hypothetical coil that is coplanar to the transmit coil 120 and that would produce the same output voltage as the canted coil, where the physical area of the hypothetical coil is less than the physical area of the canted coil. The effective area accounts for the magnetic field lines that may no longer impinge in a direction perpendicular to the receive coils 110, 130. Since the value of cos(θ) will be equal to 1 or less, the actual area of a coil may need to be similarly increased to compensate for cant angle θ to achieve the desired result. For 100% voltage cancellation, $V_{inner}+V_{outer}=0$. While 100% voltage cancellation is ideal, other lesser amounts of cancellation are acceptable and depend on the particular design needs of the transceiver and associated circuitry. For example, phase cancellation of the inner and outer receive coils 110, 130 is used to attenuate the associated receiver voltage 21 (shown in FIG. 2) to be on the same order of magnitude as, below the noise floor of, or to a desired percentage of receiver voltage 21 (shown in FIG. 2) as measured by the RMS receiver input voltage of receiver 20 (shown in FIG. 2). Generally, it is desirable to be able to filter out or distinguish the receiver voltage 21 (shown in FIG. 2) associated with voltage induced in receiver coils 110, 130 by transmit coil 120.

Expressed in general mathematical terms, $$m1\Sigma_1^{n1} A_{inner} \cos(\theta 1) = m2\Sigma_1^{n2} A_{outer} \cos(\theta 2) \qquad (1)$$

where
m1 is the number of outer receive coils 130 (e.g., m1=16);
n1 is the number of turns in an outer receive coil 130 (e.g., n1=10);
m2 is the number of inner receive coils 110 (e.g., m2=1);
n2 is the number of turns in each inner receive coil (e.g., n2=20);
A is the area enclosed by a single turn of a particular coil (for a circle, $A=\pi r^2$)
Θ1 is the angle of cant between the inner receive coil plane and the transmit coil plane; and
Θ2 is the angle of cant between the outer receive coil plane and the transmit coil plane.

In the event that outer receive coils 130 and inner receive coil(s) 110 are located in different planes, inner receive coil voltage 112 may be less than 180° out of phase with outer receive coil voltage 132; however, the general principle of phase cancellation still applies to reduce receiver voltage 21 (shown in FIG. 2) to an acceptable level for receiver 20 (shown in FIG. 2).

On the other hand, as illustrated in the left-hand side of FIG. 3, when an external magnetic field 126 (i.e., a magnetic field not generated by the collocated transmit coil 120 of transceiver antenna 100) impinges on inner receive coil 110 and on outer receive coil 130, inner receive voltages 113 and outer receive voltages 133 induced in the receive coils 110, 130, respectively, are in phase since none of receive coils 110, 130 is circumscribed by the external antenna coil generating external magnetic field 126. That is, no phase cancellation occurs since both the inner receive coils 110 and outer receive coils 130 are located outside of the external antenna coil (not shown) generating the external magnetic field 126. Also, external magnetic field 126 impinges on inner receive coil 110 and outer receive coil 130 in substantially the same direction (e.g., downward direction). Therefore, inner receive voltages 113 and outer receive voltages 133 are in phase and combine to provide a larger receiver voltage 21 to receiver 20 (shown in FIG. 2). As a result, the additive combination of in-phase receiver voltages 113, 133 effectively increases the sensitivity of the receiver antenna 106 (shown in FIG. 2) so that one may better receive a signal from a desired external magnetic field 126.

As appreciated by one of skill in the art, full cancellation of the coupling between transmit coil 120 and receive coil(s) 110, 130 becomes more difficult to achieve as the axial spacing between the coil planes is increased beyond ½ of the transmit coil diameter. Also, when the lateral spacing between coils exceeds one to two times the diameter of transmit coil 120, it is very difficult to achieve full cancellation in a configuration that does not also cancel all or most of the external signal from external magnetic field 126 that is desired to be received.

Figure 4:
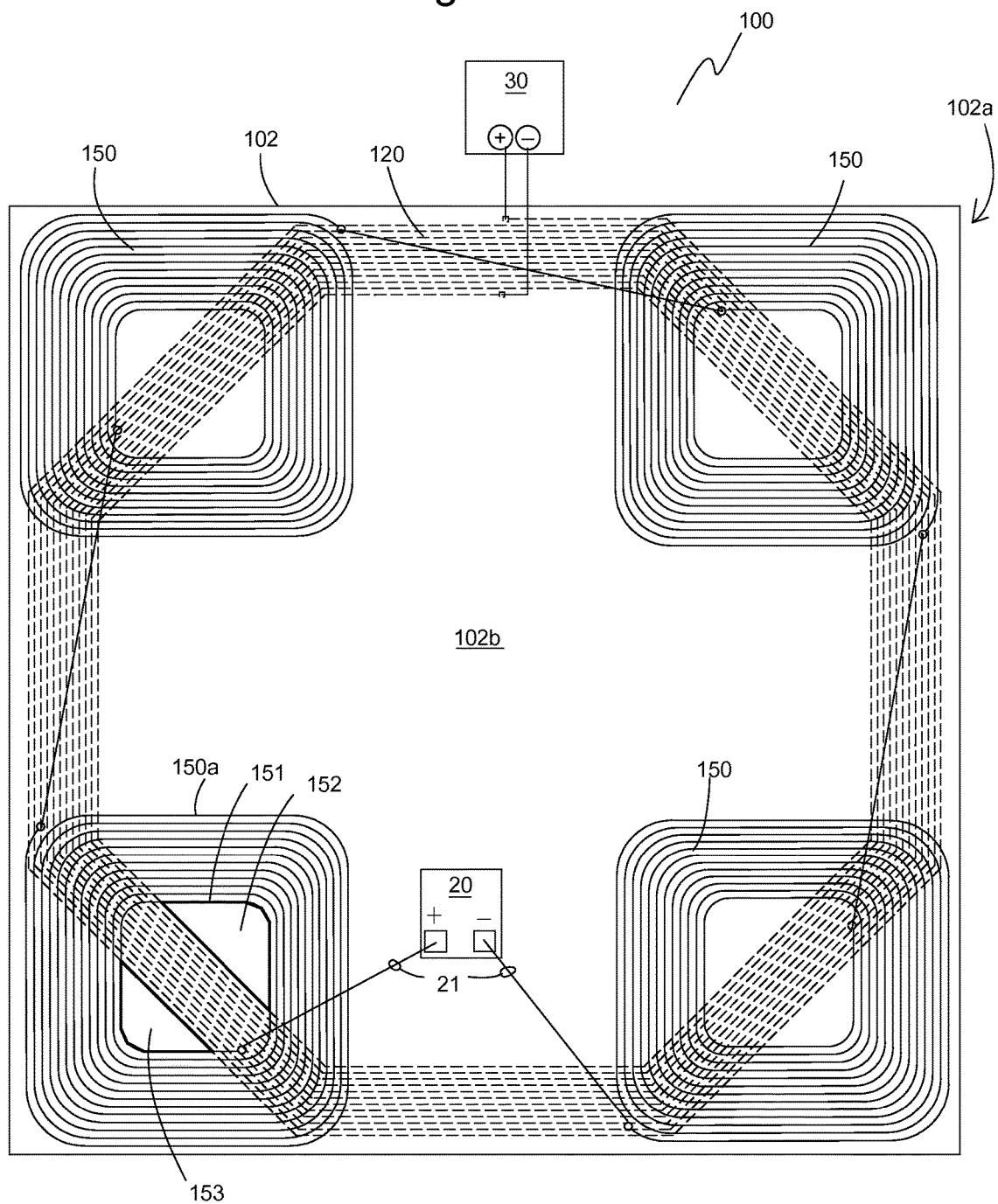
FIG. 4 is a plan view of another embodiment of a transceiver of the present invention showing a printed circuit board that includes an octagonal transmit antenna on one side of the circuit board and four receive antennas on the opposite side of the circuit board.

FIG. 4 shows a plan view of another embodiment of a transceiver antenna 100 of the present invention with transmit coil 120 and one or more receive coils 150. In one embodiment, substrate 102 is a printed circuit board, where transmit coil 120 and receive coils 150 are disposed as electrical traces on opposite sides of the printed circuit board. As shown in FIG. 4, transmit coil 120 has an octagonal shape with a plurality of turns that each define a substantially closed geometry. Transmit coil 120 is disposed on a first side 102a (back side) of printed circuit board 102 and coupled to transmitter 30. One or more receive coils 150 (e.g., four receive coils 150) are disposed on a second side 102b (front side) of the printed circuit board and connected in series. Each receive coil 150 has a plurality of turns that define a substantially closed geometry. As viewed in the plan view of FIG. 4, transmit coil 120 intersects each receive coil 150 so that the voltage induced in each receive coil 150 by the magnetic field from transmit coil 120 is partially or completely cancelled as a result of phase cancellation.

Since part of each receive coil 150 is inside the area enclosed by transmit coil 120 and part of each receive coil 150 is outside the area enclosed by transmit coil 120, the transceiver antenna 100 of FIG. 4 eliminates the need for distinct inner and outer receive coils. As discussed above with reference to FIG. 3, receive coils 150 in this embodiment are connected in series to increase the sensitivity of transceiver antenna 100 to desired signals impinging thereon. Considering the inner-most turn 151 of lower left receive coil 150a of receive coils 150 shown in FIG. 4, inner area 152 inside transmit coil 120 substantially equals outer area 153 located outside transmit coil 120. Among receive coils 150, inner areas 152 and outer areas 153 are sized so that voltage induced into receive coils 150 during transmission results in a zero (or near zero) receiver signal 21 at receiver 20. The phase cancellation during transmission, however, does not cancel voltage induced in receive coils 150 by an external magnetic field 126 generated by a transmitter distinct from transceiver antenna 100 (shown in FIG. 3.) Therefore, transceiver antenna 100 can transmit and receive at the same time with the same or different frequencies.

To achieve complete phase cancellation (or near-complete phase cancellation) in the embodiment of FIG. 4, the sum of the outer areas 153 of receive coils 150 that are located outside turns of transmit coil 120 need to be equal to (or substantially equal to) the sum of the inner areas 152 of receive coils 150 that are enclosed within turns of transmit coil 120. Transmit coil 120 and receive coils 150 in the embodiment of FIG. 4 can be any closed or substantially closed shape, including the square and octagonal shapes as shown.

Figure 5:
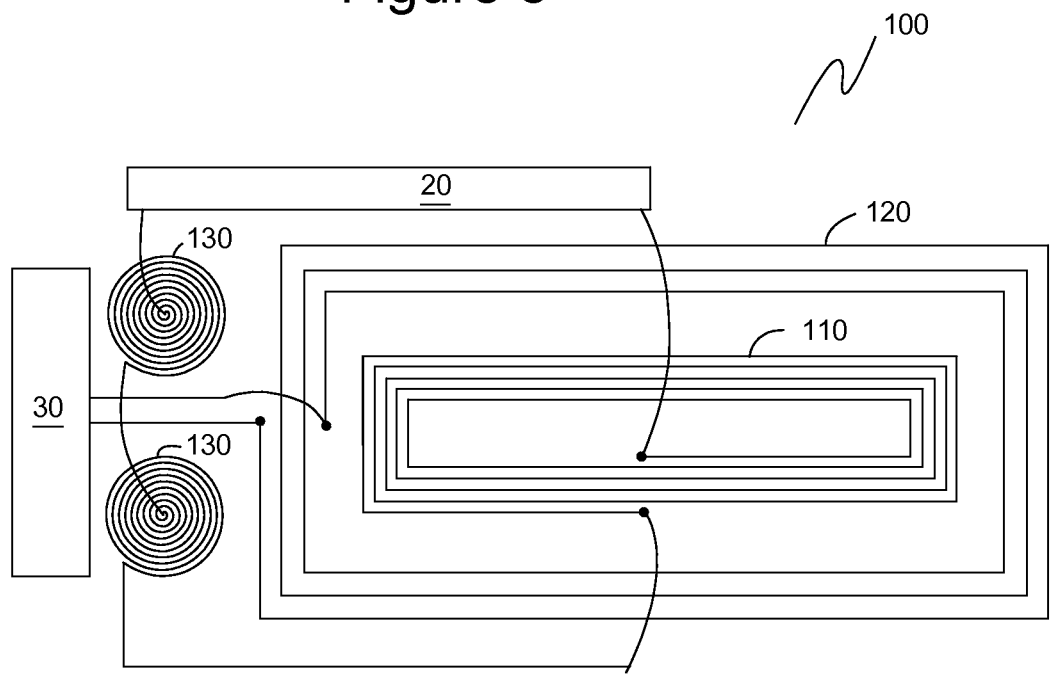
FIG. 5 is a perspective diagram of another embodiment of a transceiver of the present invention showing a transmit coil and receive coils positioned inside and outside of the transmit coil.

Referring now to FIG. 5, a plan view illustrates another embodiment of transceiver antenna 100 shown with inner receive coil 110 with a plurality of receive coil turns, transmit coil 120 with a plurality of transmit coil turns, and a plurality of outer receive coils 130 each of which has a plurality of outer receive coil turns. Inner receive coil 110 is connected in series with outer receive coils 130 and receiver 20. Transmit coil 120 is connected to transmitter 30. Each of inner receive coil 110, transmit coil 120, and outer receive coils 130 has a substantially closed geometric shape, where inner receive coil 110 is located within transmit coil 120. As with other embodiments, for substantially complete phase cancellation, the sum of the areas for turns of outer receive coils 130 is equal to or substantially equal to the sum of the areas for turns of inner receive coil 110.

Figure 6:
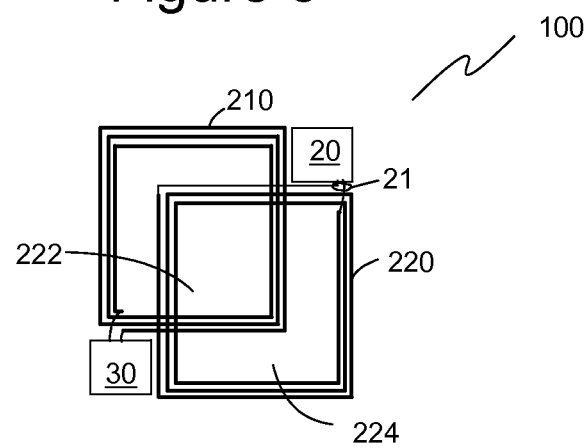
FIG. 6 is a plan view of another embodiment of a transceiver of the present invention showing a transmit coil and a receive coil, where the area of the receive coil that is inside the transmit coil is substantially equal to the area of the receive coil that is outside the transmit coil, thereby providing phase cancellation.

Referring now to FIG. 6, a plan view illustrates another embodiment of a transceiver antenna 100 with receiver 20 and transmitter 30. Transmit coil 210 has a plurality of turns that each define a substantially closed geometry. Receive coil 220 has a plurality of turns that each define a substantially closed geometry. Transmit coil 210 and receive coil 220 are rectangular as illustrated, but other closed or substantially closed shapes are acceptable. Transmit coil 210 and receive coil 220 are located on closely-spaced parallel planes, such as opposite faces of a planar substrate 102 (shown in FIG. 4). Receive coil 220 is positioned to overlap transmit coil 210 to define an inner receive coil region 222 located within the closed geometry of transmit coil 210. Receive coil 220 also defines an outer receive coil region 224 located outside the closed geometry of transmit coil 210. Inner receive coil region 222 has an area equal to or substantially equal to the area of outer receive coil region 224 to the extent required for phase cancellation to reduce receive signal 21 to the desired signal level for receiver In one embodiment, the effective area of inner receive coil region 222 is 99%, 99.4% or 99.7% of the effective area of outer receive coil region 224 (or vice versa). Therefore, during transmission using transmit coil 210, a voltage induced into receive coil 220 by transmit coil 210 results in a zero or near zero signal from transmit coil 210 due to phase cancellation. As noted above, due to the phase cancellation of voltage induced by transmit coil 210, receive coil 220 may be used to receive signals from outside magnetic fields 126 (shown in FIG. 3) at the same time transmitter 30 is transmitting.

Figure 7:
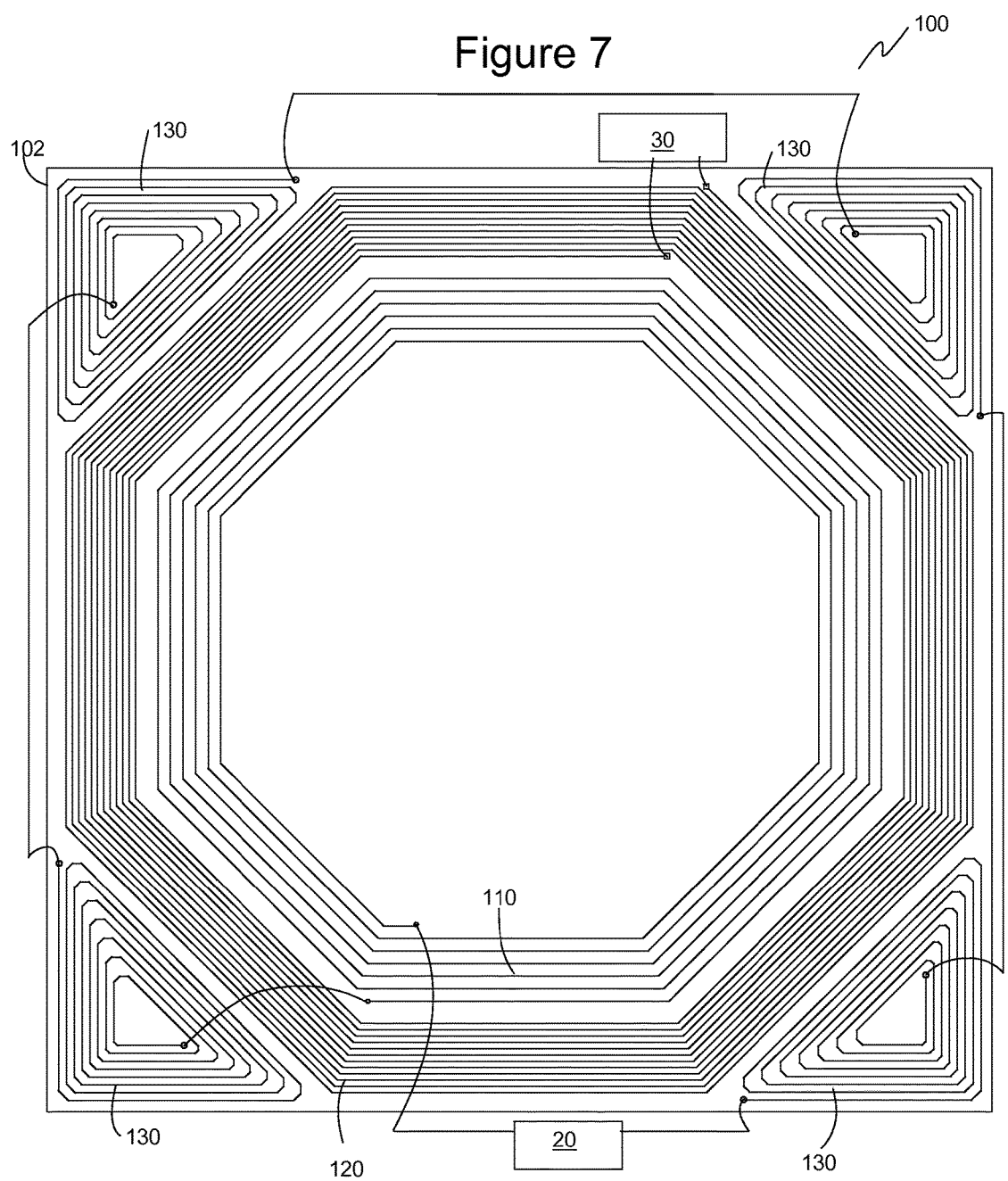
FIG. 7 is a plan view of another embodiment of a transceiver of the present invention showing an inner receive coil, a transmit coil, and a plurality of outer receive coils, where the inner and outer receive coils are connected in series.

Referring now to FIG. 7, a plan view illustrates another embodiment of a transceiver antenna 100. Similar to the embodiment of FIG. 2, transceiver antenna 100 of FIG. 7 includes transmit coil 120 with a plurality of turns that define substantially closed geometry. Inner receive coil 110 also has a plurality of turns each defining a substantially closed geometry. Inner receive coil 110 is located within the closed geometry of transmit coil 120. Located outside of transmit coil 120 are a plurality of outer receive coils 130 each having a plurality of turns that each define a substantially closed geometry. Outer receive coils 130 are connected in series with inner receive coil 110 and receiver 20. Transmit coil 120 is connected to transmitter 30. In one embodiment, transmit coil 120 and receive coils 110, 130 are coplanar on a substrate 102, such as a printed circuit board.

Figure 8:
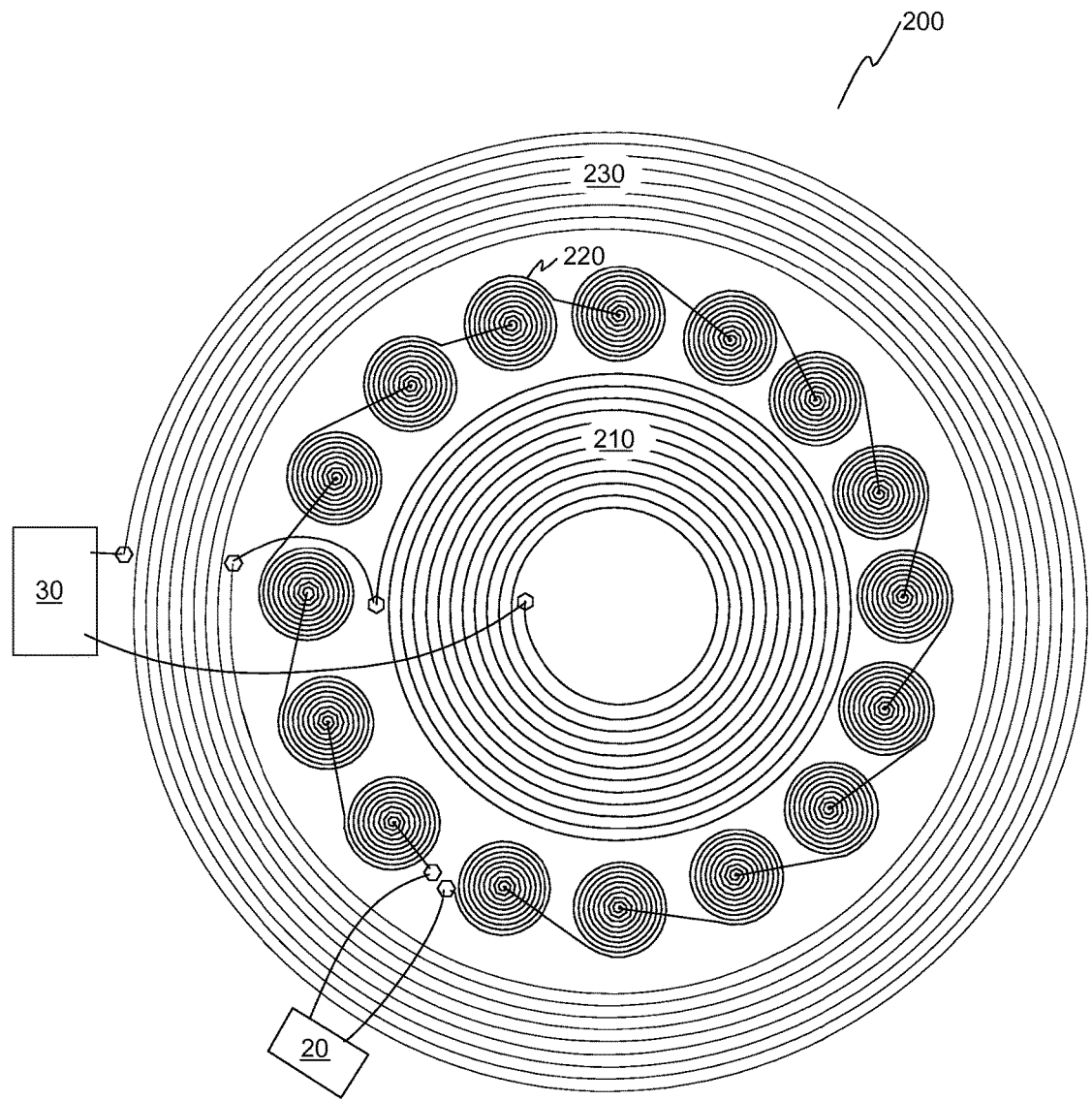
FIG. 8 is a plan view of another embodiment of a transceiver of the present invention showing a plurality of receive coils connected in series, an inner transmit coil, and an outer transmit coil, where the transmit coils are also connected in series and the receive coils are disposed radially between the inner transmit coil and the outer transmit coil.

Referring now to FIG. 8, a plan view shows another embodiment of transceiver antenna 200 with an inner transmit coil 210, a plurality of receive coils 220, and an outer transmit coil 230. Receive coils 220 are disposed outside of inner transmit coil 210 and within the area enclosed by outer transmit coil 230. Receive coils 220 each have a plurality of turns defining a substantially closed geometry. Receive coils 220 are connected in series with receiver 20. Inner transmit coil 210 is connected in series with outer transmit coil 230 and transmitter 30. A magnetic field generated by inner transmit coil 210 impinges on receive coils 220. Similarly, a magnetic field generated by outer transmit coil 230 impinges on receive coils 220. Due to the right-hand rule, the voltage induced in receive coils 220 by inner transmit coil 210 will be 180° out of phase with the voltage induced in receive coils 220 by outer transmit coil 230. Similar to embodiments of transceiver antenna 100 discussed above, the sum of voltages induced in receive coils 220 cancel the voltages induced by inner and outer transmit coils 210, 230 due to being out of phase or of reverse polarity with each other.

In use, embodiments of transceiver antennas 100, 200 of the present invention include collocated transmit antenna 104 and receive antenna 106 that utilize phase cancellation of voltages induced in the receive coils from a magnetic field of a collocated transmit antenna 104. As a result, the receiver voltage 21 induced by the collocated transmitter coil 120 is reduced sufficiently due to phase cancellation to be received by receiver 20 so that it does not damage or overload receiver 20, can be filtered as noise from desired external signals, or both. Accordingly, transceiver antennas 100, 200 of the present invention allow for simultaneous transmission and reception using the same frequency or using different frequencies.

In a method of near-field communication, a transceiver antenna is provided that includes collocated transmit and receive coils each defining a substantially closed geometry. The transmit coil circumscribes one or more areas of the receive coil(s). One or more additional areas are positioned outside of the geometry of the transmit coil. Thus, during transmit, voltage induced into the circumscribed areas of the series-connected receive coil(s) is attenuated by voltage induced into the one or more additional areas positioned outside of the geometry of the transmit coil. In some embodiments of the method, transmission is performed with a first frequency and reception is performed using a second frequency, where the first frequency and the second frequency may be the same or different frequencies. In some embodiments of the method, phase cancellation is used to attenuate by at least 99% a signal induced into the receive coils by the collocated transmit coil.

With careful design and iterations to fine tune the precise voltages generated by the inner and outer receive coils 110, 130, cancellation approaching 100% can be achieved. Cancellation in excess of 99.5% can readily be attained even with standard production tolerances. The amount of cancellation required by a particular system depends on several system parameters, including (1) the relative strength of the signal being transmitted by the collocated transmit coil compared to the (desired)) signal being received from a remote system, (2) the limit of the absolute maximum input voltage to the receiver which would cause damage to the receiver or excessive electrical non-linearity in the signal path that would result in reception errors (e.g., receiver overload), (3) the required signal-to-noise-ratio (SNR)

needed to achieve the desired bit-error-rate (BER), where the SNR is generally in the range of about 6 dB to 15 dB depending on the data coding scheme, (4) if different frequencies are used for transmission and reception then the selectivity of any RF filters used to reject the unwanted local transmitter frequency can compensate for less than 100% cancellation in the antenna, and (5) less cancellation in the antenna requires filters with higher selectivity which will add to the cost and size of equipment. When the transmit frequency and the receive frequency are the same or nearly the same, it may not be physically or economically possible in some cases to design a filter to separate them. Thus, phase cancellation can be used to achieve the desired system performance.

In embodiments discussed above, it is also possible to reverse the transmit antenna 104 with the receive antenna 106. Since mutual coupling is always reciprocal, either coil set can be used for transmit or receive. The choice of which coils are used for transmission and reception is determined by the configuration that most easily allows the optimum number of turns in the respective coils to achieve the best impedance match to the transmitter or receiver electronics. Generally, transmitters work best with lower impedance loads (therefore fewer coil turns) and receivers work best with higher impedance coils (requiring more turns) in order to generate the greatest signal voltage. However, it is not always necessary that the receiver coils 110, 130 have a higher impedance (greater effective number of turns) than the transmit coil 120.

Typical frequencies are between 1 kHz and 100 MHz or as limited by the physical dimensions of antenna 100, 200. In some cases, receive antenna 106 operates at 133 kHz while transmit antenna 104 operates at 215 kHz for communication distances on the order of tens of feet.

Transceiver antennas 100, 200 of the present invention can be implemented, for example, for secure communication, access control, and communications for miners. For example, transceiver antenna 100 is incorporated into a badge reader that communicates with an employee badge to allow access to secure facility areas.

Although embodiments and uses of the present invention have been described herein, the above description is merely illustrative. Further modification of the invention herein disclosed will occur to those skilled in the respective arts and all such modifications are deemed to be within the scope of the invention as defined by the appended claims.

I claim:

1. A transceiver antenna comprising:
a transmit antenna coil substantially defining a closed transmit geometry with an innermost transmit coil turn and an outermost transmit coil turn;
at least one inner receive antenna coil with an inner receive coil axis and having a plurality of inner coil turns each substantially defining a substantially closed inner coil geometry with an effective inner coil area, the inner receive antenna coil disposed within the innermost transmit coil turn; and
at least one outer receive antenna coil with an outer receive coil axis distinct from the inner receive coil axis of the at least one inner receive antenna coil, connected in series with the at least one inner receive antenna coil, and located outside of the outermost transmit coil turn, wherein each of the at least one outer receive antenna coil has a plurality of outer receive coil turns defining a substantially closed outer receive coil geometry with an effective outer receive coil area and is disposed outside of the outermost transmit coil turn of the transmit antenna coil;
wherein conducting a current through the transmit antenna coil induces an inner receive coil voltage in the at least one inner receive antenna coil and induces an outer receive coil voltage in the at least one outer receive antenna coil; and
wherein the inner receive coil voltage and the outer receive coil voltage at least partially cancel each other due to phase cancellation.

2. The transceiver antenna of claim 1, wherein a sum of the effective inner coil area for the plurality of inner coil turns of the at least one inner receive antenna coil is substantially equal in magnitude to a sum of the effective outer receive coil area of the plurality of outer coil turns of the at least one outer receive antenna coil.

3. The transceiver antenna of claim 1, wherein the inner receive coil voltage and the outer receive coil voltage cancel each other by at least 99% due to phase cancellation.

4. The transceiver antenna of claim 1, wherein the transmit antenna coil, the inner receive antenna coil, and the at least one outer receive antenna coil are co-planar.

5. A transceiver for near-field communication comprising:
a substantially planar substrate having a first substrate surface and a second substrate surface opposite of and substantially parallel to the first substrate surface;
a transmit antenna coil disposed on the substrate and defining a substantially closed transmit coil geometry with a transmit coil inner area, the transmit antenna coil configured to generate a transmit magnetic field when a transmit antenna current is applied to the transmit antenna coil; and
at least one receive antenna coil disposed on the substrate and electrically insulated from the transmit antenna coil, each of the at least one receive antenna coil defining a substantially closed receive coil geometry with a number of receive coil turns;
wherein the at least one receive antenna coil is positioned relative to the transmit coil geometry to define one or more inner areas located within the transmit antenna coil inner area and one or more outer areas located outside of the transmit antenna coil geometry; and
wherein the one or more inner areas and the one or more outer areas are sized and configured so that a first voltage induced by the transmit magnetic field into the one or more outer areas of the at least one receive antenna coil is attenuated by a second voltage induced by the transmit magnetic field into the one or more inner areas of the at least one receive antenna due to phase cancellation between the first voltage and the second voltage.

6. The transceiver of claim 5, wherein the one or more inner areas and the one or more outer areas are sized and configured so that the first voltage induced by the transmit magnetic field into the one or more outer areas of the at least one receive antenna coil is attenuated at least 99% by the second voltage induced by the transmit magnetic field into the one or more inner areas of the at least one receive antenna coil due to phase cancellation between the first voltage and the second voltage.

7. The transceiver of claim 5, wherein the transmit antenna coil is disposed on the first substrate surface and the at least one receive antenna coil is disposed on the second substrate surface.

8. The transceiver of claim 5, wherein the at least one receive antenna coil comprises:

at least one inner receive coil disposed within the transmit coil inner area and defining the one or more inner areas located within the transmit coil inner area; and at least one outer receive coil disposed outside the transmit antenna coil and defining the one or more outer areas located outside of the transmit antenna coil;

wherein each at least one inner receive coil is connected in series with each at least one outer receive coil.

9. The transceiver of claim 8, wherein the transmit antenna coil, the at least one inner receive coil, and the at least one outer receive coil are coplanar.

10. The transceiver of claim 8, wherein the at least one outer receive coil includes a plurality of outer receive coils connected in series.

11. The transceiver of claim 5, wherein the transmit antenna coil, the at least one inner receive coil, and the at least one outer receive coil occupy substantially parallel planes.

12. The transceiver of claim 5, wherein the at least one receive antenna coil comprises one or more receiver coils positioned to overlap the transmit antenna coil, wherein the one or more receiver coils are on a receiver plane substantially parallel to a transmit plane of the transmit antenna coil.

13. The transceiver of claim 5, further comprising:
a receiver connected in series with the at least one receive antenna coil and configured to receive a receive signal voltage; and
a transmitter connected in series with the transmit antenna coil and configured to conduct a transmitter current into the transmit antenna coil to induce the first voltage and the second voltage;
wherein the first voltage and the second voltage induced in the at least one receive antenna coil by the transmit antenna coil combine to result in a voltage no greater than the receive signal voltage.

14. A transceiver comprising:
a conductive inner transmit coil in a first plane and substantially defining a closed shape with a plurality of concentric inner transmit coil turns;
a plurality of conductive receive coils in a second plane substantially parallel to the first plane, the plurality of conductive receive coils connected in series and located outside of the conductive inner transmit coil, wherein each of the plurality of conductive receive coils substantially defines a closed receive coil shape with a plurality of concentric receive coil turns;
a conductive outer transmit coil connected in series with the conductive inner transmit coil, and substantially defining a closed outer coil shape with a plurality of concentric outer transmit coil turns each enclosing the plurality of conductive receive coils and the conductive inner transmit coil;
wherein conducting a transmitter current through the conductive inner transmit coil and the conductive outer transmit coil generates an outer coil magnetic field and an inner coil magnetic field; and
wherein the outer coil magnetic field induces a first voltage in the plurality of conductive receive coils and the inner coil magnetic field induces a second voltage in the plurality of conductive receive coils, the combination of the first voltage and the second voltage being reduced compared to either of the first voltage or the second voltage due to phase cancellation between the first voltage and the second voltage.

15. The transceiver of claim 14, wherein the phase cancellation between the first voltage and the second voltage is at least 99%.

16. The transceiver of claim 14, wherein the first plane is the same as the second plane.

17. The transceiver of claim 14, further comprising:
a receiver connected in series with the plurality of conductive receive coils and configured to receive a receive signal voltage; and
a transmitter connected to the conductive inner transmit coil and the conductive outer transmit coil, the transmitter configured to conduct a transmitter current through the conductive inner transmit coil and the conductive outer transmit coil to produce the outer coil magnetic field and the inner coil magnetic field;
wherein the first voltage and the second voltage induced in the plurality of conductive receive coils combine to result in a combined voltage substantially less than the receive signal voltage due to phase cancellation.

18. The transceiver of claim 17, wherein the combined voltage of the plurality of conductive receive coils is no more than 1% of the receive signal voltage.

19. The transceiver of claim 14, further comprising a substantially planar substrate having a first substrate surface and a second substrate surface substantially parallel to the first substrate surface, wherein the first plane is the first substrate surface and the second plane is the second substrate surface.

* * * * *